Figure 1:
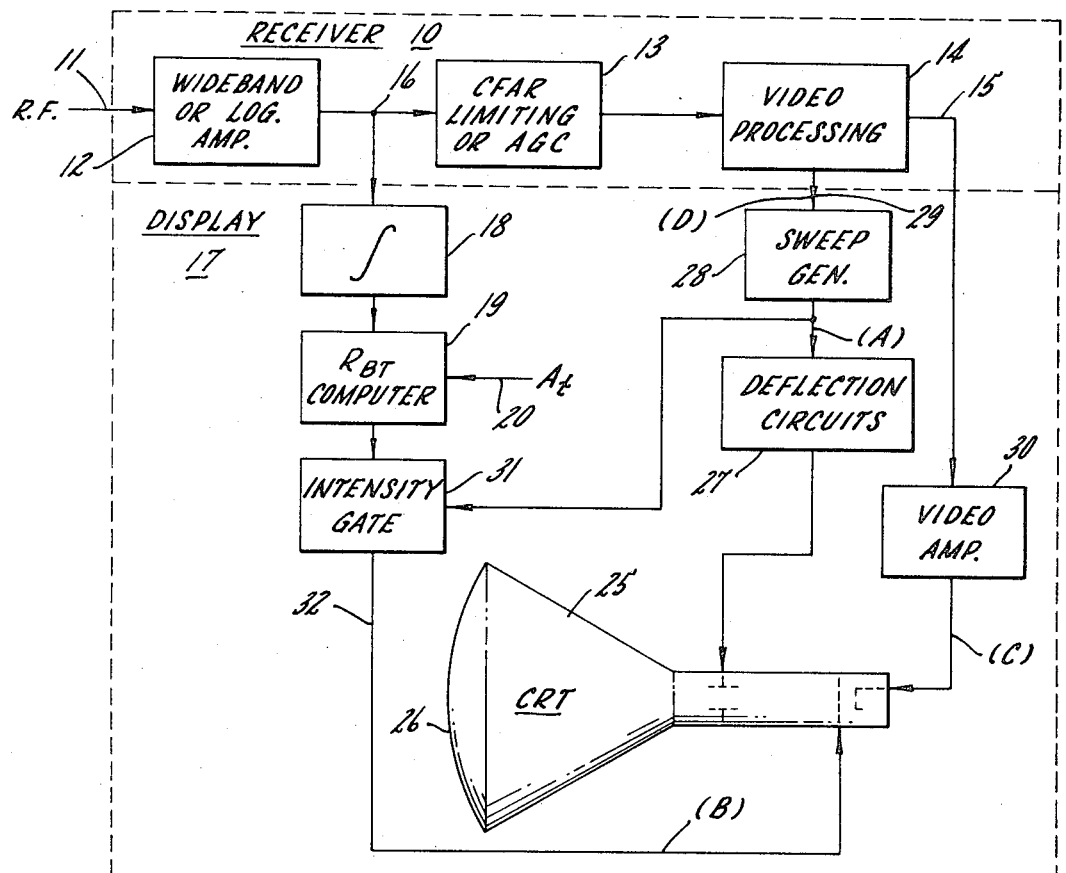

# United States Patent

Foley

[15] 3,680,106

[45] July 25, 1972

[54] METHOD FOR DISPLAYING THE RANGE DETECTION CAPABILITY OF A SEARCH RADAR IN A NOISY ENVIRONMENT

[72] Inventor: Thomas P. Foley, Severna Park, Md.

[73] Assignee: The United States of America as represented by the Secretary of the Navy

[22] Filed: May 7, 1963

[21] Appl. No.: 279,044

[52] U.S. Cl. .......................................................... 343/18 E
[51] Int. Cl. .......................................................... G01s 7/36
[58] Field of Search ..................... 343/18.5, 10, 11, 13, 17.1, 343/7.9, 18 E Primary Examiner—Malcolm F. Hubler
Attorney—Q. Baxter Warner and H. H. Losche

[57] ABSTRACT

A means of displaying the range detection capability of a search radar in a noisy environment comprising:
- a constant false alarm radar receiver for receiving echo radio frequency signals reflected from targets and subject to broadband noise jamming, said receiver having a wideband amplifier of radio frequency and a constant false alarm limiting circuit therein;
- a cathode ray display tube circuit including a sweep generator and a deflection circuit for producing cathode ray tube beam traces on the tube screen, and including two beam intensity controlling electrodes, said sweep generator being coupled to the synchronizing circuits of said receiver to synchronize the generation of sweep voltages for said deflection circuits and one of said intensity controlling electrodes being coupled to the video output of said receiver to paint targets on said screen in accordance with their range position from said receiver;
- an integrator coupled to said receiver at the output of said wideband amplifier and the input of said constant false alarm limiting circuit to produce a voltage on its output averaging the received radio and noise jamming frequencies;
- a burn-through range computer coupled to the output of said integrator and having an adjustable voltage input representative of target size, said computer producing a voltage representative of the burn-through range on an output thereof; and
- an intensity gating means coupled to the output of said range computer and to the sweep generator to gate the burnthrough range voltage on an output thereof proportional to noise jamming frequency with respect to adjusted voltage representative of target size, said intensity gating means output being coupled to the other beam intensity controlling electrode of said cathode ray display tube to light intensity with said burnthrough range voltage the range areas on said tube screen being jammed whereby operators of the radar may control the display of target information as a function of anticipated target size to eliminate false target display.

7 Claims, 3 Drawing Figures

PATENTED JUL 25 1972          3,680,106

INVENTOR.
Thomas P. Foley,
BY
H. H. Losch
Att'ys.

METHOD FOR DISPLAYING THE RANGE DETECTION CAPABILITY OF A SEARCH RADAR IN A NOISY ENVIRONMENT

This invention relates to search radar broadband noise jamming and more particularly to a means of employing a burn-through radar range computer with an adjustable input representative of expected target size to control the intensity level of the cathode ray tube display in jammed signal areas to burn through only those real targets of as large or larger reflective area than the adjusted input for expected targets.

Search radars operating in a hostile or enemy environment are usually subjected to deliberate interference or jamming which causes target confusion on the cathode ray display tube of the search radar receiver. This jamming signal interference is produced by the electronic countermeasure (ECM) equipment in hostile or enemy radar systems. Although electronic counter-counter measures (ECCM) or anti-jam (A-J) equipment has been devised, this additional equipment means further loading for aircraft radar and, likewise, may be circumvented in new techniques of jamming. It is recognized that the reception of jamming signals may be tolerated, but the radar operator should be aware of the presence of jamming or false alarm target signals being received. These search radars have been equipped with constant false alarm receiver circuits (CFAR) for controlling the gain of the receiver. In the presence of broadband noise jamming or severe atmospheric noise a frequency diversity or single frequency search radar employing CFAR devices is subject to degenerated performance due to the inability of the radar receiver to discern the reflected target signal in the presence of such noise. It is desirable for the radar operators to be aware of the degenerated range capabilities of the radar receiver in all portions of its coverage and to allow the operators to control the cathode ray tube display of this jamming information as a function of anticipated or expected target size. CFAR devices generally have a wide band amplifier to which the radio frequency (RF) energy is applied followed by a limiter and a narrow band amplifier or a logarithmic amplifier followed by a fast time constant circuit and an antilogarithmic amplifier.

In the present invention; if an output is taken from the wide band amplifier or logarithmic amplifier of such a CFAR radar and integrated over the radar dwell, it will be representative of the received noise power each dwell of the radar. By sensing the average energy received during each dwell of the radar, using this energy to predict burn-through range for a given size target, and displaying this range as functions of coverage and target size, the range degradation of the radar receiver can be made known to the operators, and controllable by them in accordance with target size. Methods of radar burn-through of real targets over jamming noise where the real targets are of greater reflective area than the jamming noise equivalent areas are more fully discussed in the text *Introduction To Radar Systems* by Merrill I. Skolnik, 1962, page 566 and in the article Electronic Dogfight: ECM vs ECCM In Search Radar by Peter R. Dax in the periodical *Space/Aeronautics*, April 1960, pages 134 – 137. This is accomplished by coupling into the radar, between the wide band or logarithmic amplifier and the CFAR limiting circuit, an integrating circuit to average the received energy. The output of the integrator is coupled as one input to a burn-through computer, the other input thereto being a manually adjustable voltage representative of anticipated target size. The computer provides an output voltage which, when applied to one of the beam intensity electrodes of the cathode ray display tube, will produce a tube brightness that will prevent false targets from showing. Any targets of a reflective size greater than preset into the computer that do not appear in the high intensity or bright areas will burn-through as real targets. The burn-through voltage from the burn-through computer is gated by the sweep circuitry of the cathode ray tube to synchronize the receiver and the tube display. The adjustable voltage input to the burn-through computer is controllable by the radar operators to set-in the anticipated or expected target size. Any targets of larger size or reflective area will "burn-through" the high intensity display areas on the tube screen as real targets even though the radar is being jammed in that range area. It is therefore a general object of this invention to provide a ranging radar display of target objects in which false targets produced by jamming signals will be ineffective in that the display tube intensity will be increased in the jamming range areas and only targets of larger than predetermined size will burn-through the jammed environment providing operating personnel with the degenerated range capabilities of the radar.

Figure 3:
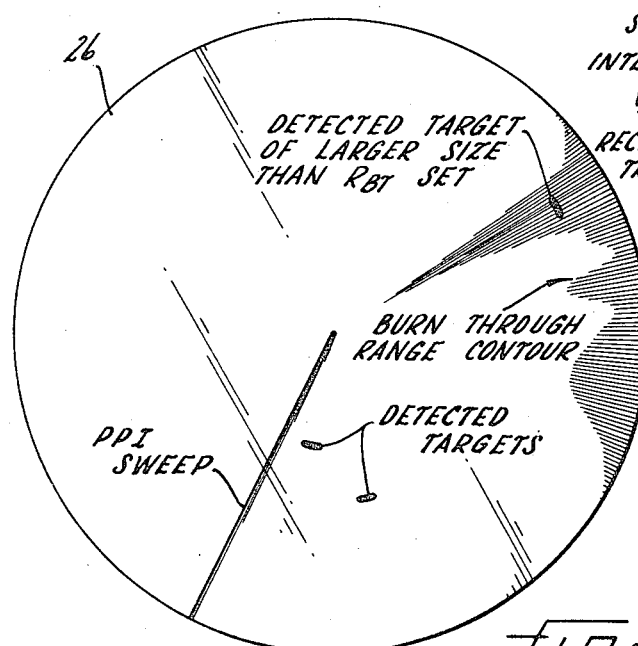
Figure 2:
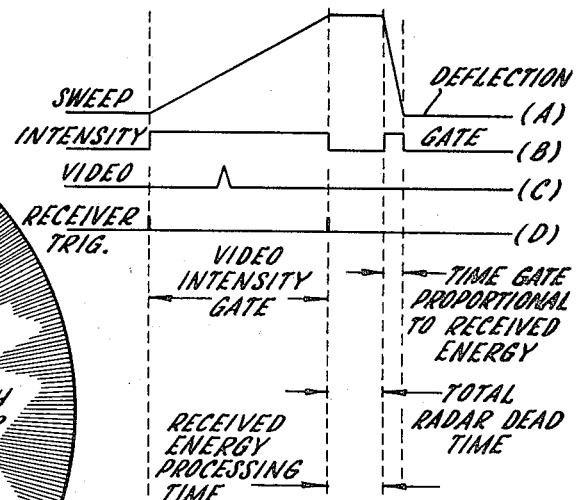

These and other objects and the attendant advantages, features, and uses of the invention will become clear to those skilled in the art as the description proceeds, in which:

FIG. 1 is a block circuit schematic diagram with arrows on the block leads indicating the flow of information, FIG. 2 illustrates the wave forms of the several bits of information flowing in FIG. 1, and FIG. 3 is a face view of a plan-position-indicator giving examples of target objects and burn-through range contours as may be observed on the radar indicator from the circuit of FIG. 1.

Referring more particularly to FIG. 1 with occasional reference to FIG. 2, there is shown a block circuit diagram of a search radar receiver 10 of any well-known type employing preferably CFAR for a noise or jam environment. The radar receiver circuit within the dotted line area 10 is simplified although it is well understood by those skilled in the art that such a receiver is known to provide video signals to a target display component, shown within the dotted line block 17. The received echo radar signals are conducted as RF from the antenna means on the conductor means 11 to a wideband or logarithmic amplifier 12. Wideband and logarithmic amplifiers are well known in the art and will not be further described herein. The output of the wideband or logarithmic amplifier 12 is coupled through a CFAR circuit, a limiting circuit, or an automatic gain control circuit (AGC) to provide constant false alarm analysis of the received RF echo signals. The use of CFAR, limiting or AGC circuitry in radar receivers is more fully discussed in the text *Introduction to Radar Systems* by by Merrill I. Skolnik (1962) in the section 12.10 and will not be described in detail herein. The CFAR, limiting, or AGC circuit 13 is coupled to the video processing circuitry 14 of the radar receiver for developing the video signals on an output 15 thereof in a manner well understood by those skilled in the search radar art. In the usual practice of such radars the video signals on the output 15 are coupled into the radar display circuits which will provide indications of the target or targets on the screen of the display indicator. The targets displayed may also show false alarm targets produced in a jamming environment by either active or passive false targets. Such false alarm targets along with real targets are, of course, confusing to radar operating personnel.

In the present invention, the RF echo signals are taken from a terminal point 16 coupling the wideband or logarithmic amplifier 12 to the CFAR, limiting, or AGC circuit 13 of the receiver 10 and integrated in an integrator 18 in the display circuit 17 to average the received RF energy. The integrated output of the integrator 18 is coupled as one input to a burn-through range computer 19. This average signal power $P_r$ becomes a D.C. voltage out of the integrator 18. The range capability $R_m$ of a radar may be stated by the following formula:

$$R_m = \frac{1}{2\sqrt{\pi}} \sqrt{(P_t d)\left(\frac{1}{P_{r_{min}} d}\right)(G_t A_r)(O_n)} \quad (1)$$

where $P_t d$ is the transmitted energy $$\frac{1}{P_{r_{min}} d}$$

is the minimum energy detectable by the receiver $G_t A_r$ are the factors of the radar antenna characteristics $O_n$ are factors of target characteristics This equation can be rewritten for a specific radar receiver when the received noise significantly exceeds the internal noise as:

$$R_{bt} = K\sqrt{\frac{A_t}{P_r}} \qquad (2)$$

where

K includes transmitted power, antenna, receiver, and processing constants
$A_t$ is the effective target reflective area
$P_r$ is the received power and
$R_{bt}$ is the burn-through range.

The burn-through range computer 19 has a second input $A_t$ shown as being applied over the conductor means 20, although it is to be understood that this may be a mere manual control of a potentiometer or other means of applying a DC voltage representative of the anticipated target reflective area or target size to the computer. The burn-through range computer 19 performs the computing function, as indicated by formula (2) above, to produce on its output a burn-through range voltage capable of increasing the intensity of the display in the high jamming range area, as will soon be described. This burnthrough computer may be of any known computer design to perform the multiplication, division, and square functions of analog voltages as more fully described in the text *Analog Computer Techniques* by Clarence L. Johnson 1956, Chapter 5, where circuits illustrate the solution in analog voltage of the above functions. The solution of equation (2) may be performed by any of these well-known computer circuits, to provide the analog voltage of $R_{bt}$.

The display of targets in the display circuitry 17 is provided by a cathode ray tube 25 having a fluorescent screen 26 thereon. The beam of the cathode ray tube 25 is made to scan by the deflection circuits 27 from sweep voltages generated by the sweep generator 28 in the well known manner of CRT electronics to produce sweep voltages for either a plan-position-indicator or an elevation indicator of the range-height type, these generated sweep voltages being developed in synchronism with the synchronizing circuits of the receiver 10 as shown coupled by the conductor means 29. The sweep voltages generated are coupled through the deflection circuits 27 to the deflection plates or coils of the cathode ray tube 25, as shown by the waveform A in FIG. 2, in accordance with the time established by the receiver triggers indicated in the wave form D of FIG. 2. The trigger pulses D from the radar receiver are indicated as on the conductor means 29 while the output of the sweep generator 28 indicates the A wave form as shown in FIG. 2. The video output 15 of the radar receiver 10 is conducted through a video amplifier 30 to the cathode of the cathode ray tube 25, this video being indicated by the wave form C in FIG. 2 on the conductor means to the cathode, as indicated. The cathode ray tube 25, with circuit changes described, would indicate real targets on the screen 26, but not false targets. By controlling the voltage on the grid of the cathode ray tube 25 to vary the intensity of the tube in accordance with burn-through range voltage, the false alarm targets will be eliminated.

In order to accomplish the elimination of the false alarm targets, the burn-through range voltage form the burn-through computer 19 is gated in an intensity gate 31 by the sweep voltage generated in the sweep voltage generator 28. This produces on the output 32 of the intensity gate a voltage as shown by the wave form B in FIG. 2 applied to the grid of the cathode ray tube 25. The burn-through range voltage will increase wherever a jamming environment exists in the range of the origin of the jamming signals. If the cathode ray tube display 25 is of the planned-position-indicator type, as shown in FIG. 3, a burn-through range contour for the range area producing jammed signals will be shown as indicated in FIG. 3 on the cathode ray tube screen 26.

OPERATION

In the operation of the device as shown in FIG. 1 with a PPI display as shown in FIG. 3, let it be assumed that noise jamming signals are being received in a certain range area as indicated by the burn-through range contour in FIG. 3. As a number of false alarm targets from either passive or active enemy action are produced in the range coming within the range burn-through contour as shown in FIG. 3, they will not be discernible through the brightened area of this burn-through range contour if they are of a reflective area smaller than that preset into the burn-through range computer 19 by the control 20. The operator of the radar will preset the control 20 representative of $A_t$ for the anticipated target size or the reflecting target area of the energy. Where the target in the range area of jamming signals is of a larger area than that preset into the burn-through range computer 19 by the control 20, this real or true target will "burn-through". The burn-through range contour indicating the jammed range environment is intensified as shown with a detected target burning through, in FIG. 3. In this manner, radar operating personnel can eliminate passive or active false targets, such as that caused by chaff dumped into the atmosphere by enemy action or false signals produced by enemy radar with a time delay of a target representative of small reflective areas, by adjusting the $A_t$ factor for the burn-through range computer 19 of this system. By actually displaying the burn-through range contour, radar operators will be readily made aware of the enemy jamming environment and the amount of degeneration of the range capabilities produced on their own radar. Radar operators can readily control the burn-through range contour intensity to control the display of information as a function of anticipated target size.

While many modifications and changes may be made in the constructional details and features of this invention to arrive at the means disclosed herein, it is to be understood that I desire to be limited in the spirit of my invention only by the scope of the appended claims.

I claim:

1. A means of displaying the range detection capability of a search radar in a noisy environment comprising:
    a radar receiver for receiving echo radio frequency signals reflected from targets and subject to jamming signals;
    a cathode ray display tube coupled to said receiver for displaying target echoes received by said receiver, said tube having circuits to produce sweep voltages therefor;
    a burn-through range computer coupled to said receiver to produce an analog voltage of the burn-through range from all energy received with respect to an expected target size on an output thereof; and
    an intensity gating means coupled to the output of said computer and to the sweep voltage circuits to gate the burnthrough range voltage on an output thereof proportional to the degree of target jamming, said intensity gating means output being coupled to said cathode ray tube to intensify the areas of target jamming with said burnthrough range voltage whereby the intensified areas on said cathode ray tube display indicate the jammed areas in range through which only targets of predetermined area will burn-through for display.

2. A means of displaying the range detection capability of a search radar in a noisy environment comprising:
    a radar receiver for receiving echo radio frequency signals reflected from targets and subject to jamming signals;
    a cathode ray display tube circuit having a sweep generator and deflection circuit to produce cathode ray tube beam traces and having two beam intensity control electrodes, said sweep generator and one of said beam intensity electrodes being coupled to said receiver to trigger said sweep generator in synchronism with said receiver and to intensify said beam at range locations on the cathode ray tube face proportional to the range of targets reflecting the echo signals;

a burn-through range computer coupled to said receiver to receive said radio frequency signal energy and having an adjustable factor as an input representative of target size, said computer producing a voltage representative of the burn-through range on an output thereof; and an intensity gating means coupled to the output of said computer and to the sweep generator to gate the burnthrough range voltage on an output thereof proportional to the signal energy received with respect to the expected target on an output thereof, said intensity gating means output being coupled to the other beam intensity control electrode of said cathode ray tube to light intensify with said burnthrough range voltage the areas being jammed whereby burn-through range areas are displayed and any targets appearing in these areas will be of a size greater than the target size factor adjusted into said burn-through computer.

3. A means of displaying the range detection capability of a search radar in a noisy environment as set forth in claim 2 wherein said burn-through range computer is coupled to said receiver through an integrating means for averaging the received echo signals whereby the received averaged energy is applied to said computer.

4. A means of displaying the range detection capability of a search radar in a noisy environment as set forth in claim 3 wherein said receiver includes a wide band amplifier and a constant false alarm circuit coupled in series and said integrating means and burn-through computer are coupled in said receiver at a point between said wide band amplifier and said constant false alarm circuit.

5. A means of displaying the range detection capability of a search radar in a noisy environment comprising:

a constant false alarm radar receiver for receiving echo radio frequency signals reflected from targets and subject to broadband noise jamming, said receiver having a wideband amplifier of radio frequency and a constant false alarm limiting circuit therein;

a cathode ray display tube circuit including a sweep generator and a deflection circuit for producing cathode ray tube beam traces on the tube screen, and including two beam intensity controlling electrodes, said sweep generator being coupled to the synchronizing circuits of said receiver to synchronize the generation of sweep voltages for said deflection circuits and one of said intensity controlling electrodes being coupled to the video output of said receiver to paint targets on said screen in accordance with their range position from said receiver;

an integrator coupled to said receiver at the output of said wideband amplifier and the input of said constant false alarm limiting circuit to produce a voltage on its output averaging the received radio and noise jamming frequencies;

a burn-through range computer coupled to the output of said integrator and having an adjustable voltage input representative of target size, said computer producing a voltage representative of the burn-through range on an output thereof; and an intensity gating means coupled to the output of said range computer and to the sweep generator to gate the burnthrough range voltage on an output thereof proportional to noise jamming frequency with respect to adjusted voltage representative of target size, said intensity gating means output being coupled to the other beam intensity controlling electrode of said cathode ray display tube to light intensify with said burnthrough range voltage the range areas on said tube screen being jammed whereby operators of the radar may control the display of target information as a function of anticipated target size to eliminate false target display.

6. A means of displaying the range detection capability of a search radar in a noisy environment as set forth in claim 5 wherein said video output of said receiver coupled to said one intensity controlling electrode of said cathode ray display tube is through a video amplifier in said coupling.

7. A means of displaying the range detection capability of a search radar in a noisy environment as set forth in claim 6 wherein said cathode ray display tube circuit including said sweep generator and deflection circuit are constructed and arranged to provide plan-position-indication on said screen.

* * * * *